United States Patent
Seubert et al.

(10) Patent No.: US 10,799,905 B2
(45) Date of Patent: Oct. 13, 2020

(54) ULTRASONIC MATERIAL APPLICATORS AND METHODS OF USE THEREOF

(71) Applicant: Ford Motor Company, Dearborn, MI (US)

(72) Inventors: Christopher Michael Seubert, New Hudson, MI (US); Mark Edward Nichols, Saline, MI (US); Kevin Richard John Ellwood, Ann Arbor, MI (US); Wanjiao Liu, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/211,334

(22) Filed: Dec. 6, 2018

(65) Prior Publication Data

US 2019/0232321 A1 Aug. 1, 2019

Related U.S. Application Data

(60) Provisional application No. 62/624,013, filed on Jan. 30, 2018.

(51) Int. Cl.
*B05D 1/02* (2006.01)
*B05D 1/12* (2006.01)
(Continued)

(52) U.S. Cl.
CPC .......... *B05B 17/0646* (2013.01); *B05B 1/262* (2013.01); *B05B 3/02* (2013.01);
(Continued)

(58) Field of Classification Search
CPC ... B05B 17/0646; B05B 17/06; B05B 17/063; B05B 17/0653; B05B 17/0669;
(Continued)

(56) References Cited

U.S. PATENT DOCUMENTS

| 4,038,570 A | | 7/1977 | Durley, III |
| 5,213,620 A | * | 5/1993 | Meyer ................. B05B 13/0452 |
| | | | 118/323 |

(Continued)

FOREIGN PATENT DOCUMENTS

| CN | 103736620 | 4/2014 |
| CN | 104689946 | 6/2015 |

(Continued)

OTHER PUBLICATIONS

Hielscher—Ultrasound Technology, Ultrasonic Spraying, Nebulizing, and Atomizing, Sep. 17, 2018.
(Continued)

*Primary Examiner* — Michael P Wieczorek
(74) *Attorney, Agent, or Firm* — Burris Law, PLLC (57) ABSTRACT

A method of controlling application of material onto a substrate includes ejecting atomized droplets from an array of micro-applicators while the array of micro-applicators cyclically moves about at least one axis. The atomized droplets from each of the plurality of micro-applicators overlap with atomized droplets from adjacent micro-applicators and a diffuse overlap of deposited atomized droplets from adjacent micro-applicators is provided on a surface of the substrate. The array of micro-applicators cyclically rotates back and forth around the at least one axis and/or moves back and forth parallel to the at least one axis. For example, the at least one axis can be a central axis of the array of micro-applicators, a length axis of the array of micro-applicators, a width axis of the array of micro-applicators, and the like. Also, the array of micro-applicators can be part of an ultrasonic material applicator used to paint vehicles.

16 Claims, 6 Drawing Sheets

(51) Int. Cl.

| | | |
|---|---|---|
| *B05B 17/00* | (2006.01) | |
| *B05B 17/06* | (2006.01) | |
| *B05B 13/04* | (2006.01) | |
| *B05B 3/14* | (2006.01) | |
| *B05B 3/02* | (2006.01) | |
| *B05B 15/628* | (2018.01) | |
| *B05B 12/36* | (2018.01) | |
| *B05B 15/625* | (2018.01) | |
| *B05B 12/16* | (2018.01) | |
| *B05B 7/14* | (2006.01) | |
| *B25J 11/00* | (2006.01) | |
| *B05B 12/00* | (2018.01) | |
| *B05B 15/68* | (2018.01) | |
| *B05B 1/26* | (2006.01) | |
| *B05B 15/00* | (2018.01) | |
| *B05D 3/06* | (2006.01) | |

(52) U.S. Cl.
 CPC .............. *B05B 3/14* (2013.01); *B05B 7/1481* (2013.01); *B05B 12/00* (2013.01); *B05B 12/16* (2018.02); *B05B 12/36* (2018.02); *B05B 13/0431* (2013.01); *B05B 13/0452* (2013.01); *B05B 15/00* (2013.01); *B05B 15/625* (2018.02); *B05B 15/628* (2018.02); *B05B 15/68* (2018.02); *B05B 17/06* (2013.01); *B05B 17/063* (2013.01); *B05B 17/0653* (2013.01); *B05B 17/0669* (2013.01); *B05D 1/02* (2013.01); *B05D 1/12* (2013.01); *B05D 3/067* (2013.01); *B25J 11/0075* (2013.01)

(58) Field of Classification Search
 CPC ..... B05B 15/628; B05B 15/68; B05B 15/625; B05B 12/16; B05B 12/36; B05B 3/02; B05B 3/14; B05B 13/0405; B05B 13/041; B05B 13/0415; B05B 13/0452; B05D 1/02; B05D 1/12
 See application file for complete search history.

(56) References Cited

U.S. PATENT DOCUMENTS

| | | |
|---|---|---|
| 5,387,444 A | 2/1995 | Bachmann |
| 5,516,043 A | 5/1996 | Manna et al. |
| 5,540,384 A | 7/1996 | Erickson et al. |
| 5,624,075 A | 4/1997 | Dankert |
| 5,636,798 A | 6/1997 | Buschor |
| 5,669,971 A | 9/1997 | Bok et al. |
| 5,823,428 A | 10/1998 | Humberstone et al. |
| 6,349,668 B1 * | 2/2002 | Sun .......................... B05B 5/00 118/723 E |
| 6,394,363 B1 | 5/2002 | Amott et al. |
| 6,666,835 B2 | 12/2003 | Martin et al. |
| 6,755,985 B2 | 6/2004 | Fiala et al. |
| 7,168,633 B2 | 1/2007 | Wang et al. |
| 7,350,890 B2 | 4/2008 | Baird et al. |
| 7,550,897 B2 | 6/2009 | Hailes |
| 7,704,564 B2 | 4/2010 | DeRegge et al. |
| 7,934,665 B2 | 5/2011 | Erickson et al. |
| 7,976,135 B2 | 7/2011 | Brown et al. |
| 7,977,849 B2 | 7/2011 | Hailes et al. |
| 8,191,982 B2 | 6/2012 | Brown et al. |
| 8,317,299 B2 | 11/2012 | Brown |
| 8,440,014 B2 | 5/2013 | Kitamura et al. |
| 8,524,330 B2 | 9/2013 | Fan et al. |
| 8,821,802 B2 | 9/2014 | Haran |
| 9,149,750 B2 | 10/2015 | Steele et al. |
| 9,156,049 B2 | 10/2015 | Galluzzo et al. |
| 9,452,442 B2 | 9/2016 | Selby et al. |
| 9,592,524 B2 | 3/2017 | Fritz et al. |
| 2006/0005766 A1 | 1/2006 | Gorges et al. |
| 2007/0102537 A1 | 5/2007 | Stauch et al. |
| 2010/0183820 A1 | 7/2010 | Seubert et al. |
| 2010/0285234 A1 | 11/2010 | Van Den Berg et al. |
| 2014/0110500 A1 | 4/2014 | Crichton et al. |
| 2016/0059262 A1 | 3/2016 | Seyler |
| 2016/0158789 A1 | 6/2016 | Selby et al. |
| 2016/0228902 A1 | 8/2016 | Crichton |

FOREIGN PATENT DOCUMENTS

| | | |
|---|---|---|
| CN | 104841592 | 8/2015 |
| DE | 19631811 | 2/1998 |
| DE | 20023848 | 12/2006 |
| DE | 102011088373 | 6/2013 |
| DE | 102013205171 | 9/2014 |
| EP | 1884365 | 2/2008 |
| GB | 2215240 | 9/1989 |
| JP | H0538809 | 2/1993 |
| JP | H08215616 | 8/1996 |
| JP | 2003091010 | 3/2003 |
| KR | 20180080977 | 7/2018 |
| WO | 2018108572 | 6/2018 |
| WO | 2018162872 | 9/2018 |

OTHER PUBLICATIONS

Ransburg, Evolver 303 Dual Purge Solventborne Robotic Atomizers, Model: A12374-XXX, Service Manual AA-08-01.5, May 2015.

Regan, Michael, UV Coatings: Curing at Light-Speed, BodyShop Business, May 1, 2005.

* cited by examiner

ULTRASONIC MATERIAL APPLICATORS AND METHODS OF USE THEREOF

CROSS-REFERENCE TO RELATED APPLICATIONS

This application claims the benefit of provisional application Ser. No. 62/624,013, filed on Jan. 30, 2018. The disclosure of the above application is incorporated herein by reference.

FIELD

The present disclosure relates to the painting of vehicles, and more particularly to methods and equipment used in high volume production to paint the vehicles and components thereof.

BACKGROUND

The statements in this section merely provide background information related to the present disclosure and may not constitute prior art.

Painting automotive vehicles in a high volume production environment involves substantial capital cost, not only for application and control of the paint, but also for equipment to capture overspray. The overspray can be up to 40% of the paint that exits an applicator, or in other words, up to 40% of the paint that is purchased and applied is wasted (i.e. the transfer efficiency is ~60%). Equipment that captures overspray involves significant capital expenses when a paint shop is constructed, including large air handling systems to carry overspray down through a paint booth, construction of a continuous stream of water that flows under a floor of the paint booth to capture the overspray, filtration systems, and abatement, among others. In addition, costs to operate the equipment is high because air (flowing at greater than 200K CFM) that flows through the paint booths must be conditioned, the flow of water must be maintained, compressed air must be supplied, and complex electrostatics are employed to improve transfer efficiency.

With known production equipment, paint is atomized by rotating bells, which are essentially a rotating disk or bowl that spins at about 20,000-80,000 rpms. The paint is typically ejected from an annular slot on a face of the rotating disk and is transported to the edges of the bell via centrifugal force. The paint then forms ligaments, which then break into droplets at the edges of the bell. Although this equipment works for its intended purpose, various issues arise as a result of its design. First, the momentum of the paint is mostly lateral, meaning it is moving off of the edge of the bell rather than towards the vehicle. To compensate for this movement, shaping air is applied that redirects the paint droplets towards the vehicle. In addition, electrostatics are used to steer the droplets towards the vehicle. The droplets have a fairly wide size distribution, which can cause appearance issues.

Ultrasonic atomization is an efficient means of producing droplets with a narrow size distribution with a droplet momentum perpendicular to the applicator surface (e.g., towards a surface of a vehicle). However, streams of droplets with a narrow size distribution may not provide a coating with uniform thickness.

This issue of coating uniformity, among other issues related to the painting of automotive vehicles or other objects in a high volume production environment, are addressed by the present disclosure.

SUMMARY

Further areas of applicability will become apparent from the description provided herein. It should be understood that the description and specific examples are intended for purposes of illustration only and are not intended to limit the scope of the present disclosure.

In one form of the present disclosure a method of controlling application of material onto a substrate includes ejecting atomized droplets from an array of micro-applicators while the array of micro-applicators cyclically moves about at least one axis such that the atomized droplets from each of the plurality of micro-applicators overlap with atomized droplets from adjacent micro-applicators and a diffuse overlap of deposited atomized droplets from adjacent micro-applicators is provided on a surface of the substrate. In some aspects of the present disclosure, the array of micro-applicators cyclically rotate back and forth, e.g., at a predetermined frequency, around the at least one axis. In other aspects of the present disclosure, the array of micro-applicators moves back and forth parallel to the at least one axis. In some aspects of the present disclosure, the at least one axis is a central axis of the array of micro-applicators. In other aspects of the present disclosure, the at least one axis is a length axis of the array of micro-applicators, a width axis of the array of micro-applicators, a pair of orthogonal axes of the array of micro-applicators, and the like. In aspects where the at least one axis is a pair of orthogonal axes, the array of micro-applicators are enabled to move back and forth, parallel to each of the pair of orthogonal axes.

In some aspects of the present disclosure, the array of micro-applicators is part of an ultrasonic material applicator and/or the surface of the substrate can be a surface of a vehicle. In such aspects, a vehicle can be painted by ejecting the atomized droplets from the array of micro-applicators and moving the array of micro-applicators cyclically about the at least one axis.

In another form of the present disclosure, a method for applying a coating to a vehicle includes ejecting atomized droplets of a coating material from an array of micro-applicators. The atomized droplets travel line-of-sight from the array of micro-applicators to a surface of the vehicle and the array of applicators are moved along a pattern adjacent to the surface of the vehicle such that the surface is coating with the coating material. The array of micro-applicators cyclically move about an axis of the array of micro-applicators such that the atomized droplets from each of the plurality of micro-applicators overlap with atomized droplets from adjacent micro-applicators and diffuse overlap with each other to form the coating on the surface of the vehicle without streaks.

In some aspects of the present disclosure, the array of micro-applicators rotates back and forth, e.g., at a predetermined frequency, around the axis of the array of micro-applicators. In other aspects of the present disclosure, the array of micro-applicators moves back and forth, e.g., at a predetermined frequency, parallel to the axis of the array of micro-applicators.

In still another form of the present disclosure, an ultrasonic atomization material applicator includes at least one array of micro-applicators and at least one supply line configured to supply at least one material to each of the micro-applicators. At least one ultrasonic transducer is 
mechanically coupled to the at least one array of micro-applicators. The at least one ultrasonic transducer is configured to vibrate the at least one array of micro-applicators such that atomized droplets of the at least one material are ejected from each of the micro-applicators. A movement device is mechanically coupled to the at least one array of micro-applicators. The movement device is configured to cyclically move the at least one array of micro-applicators back and forth about an axis of the at least one array of micro-applicators such that the atomized droplets from each of the plurality of micro-applicators overlap with atomized droplets from adjacent micro-applicators due to the cyclic moving of the array of micro-applicators about the axis.

In some aspects of the present disclosure, the movement device is a rotational movement device configured to cyclically rotate the at least one array of micro-applicators back and forth around the axis at a predetermined frequency. In other aspects of the present disclosure, the movement device is a translational movement device configured to cyclically move the at least one array of micro-applicators back and forth along the axis at a predetermined frequency. Also, the ultrasonic atomization material applicator may include a robotic arm configured to move the at least one array of micro-applicators across a surface along a pattern while the movement device cyclically moves the at least one array of micro-applicators back and forth about the axis of the at least one array of micro-applicators.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Figure 1:
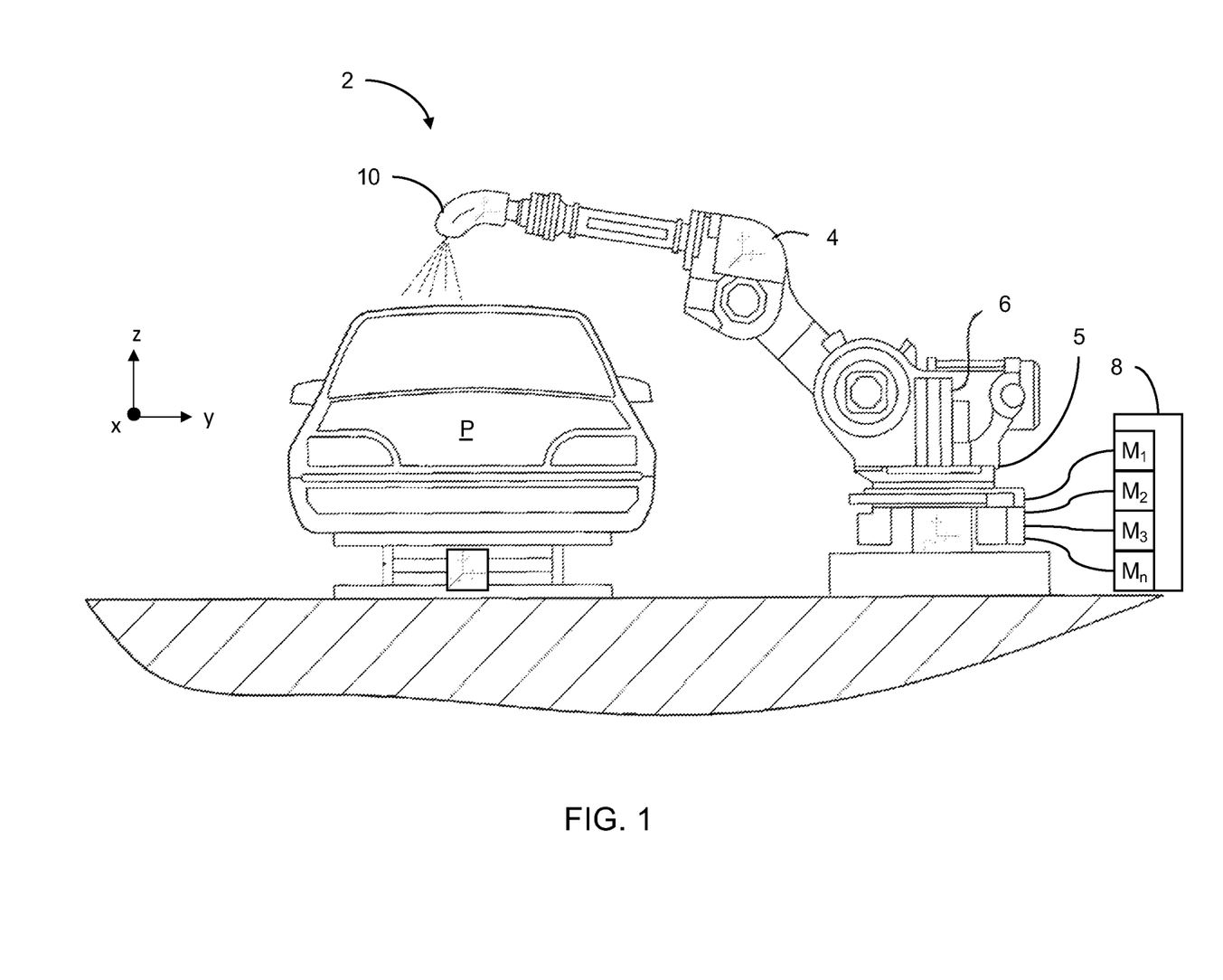
FIG. 1 is a planar view of an exemplary paint spray system according to the teachings of the present disclosure.
Figure 2A:
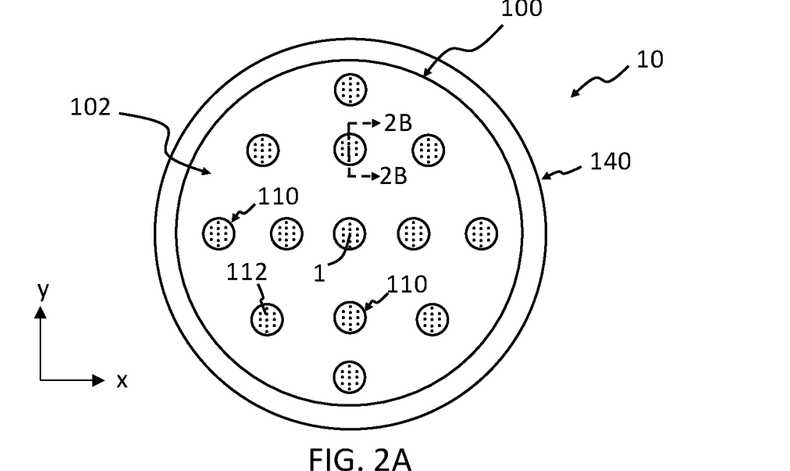
FIG. 2A schematically depicts a planar view of an array of micro-applicators according to the teachings of the present disclosure.
Figure 2B:
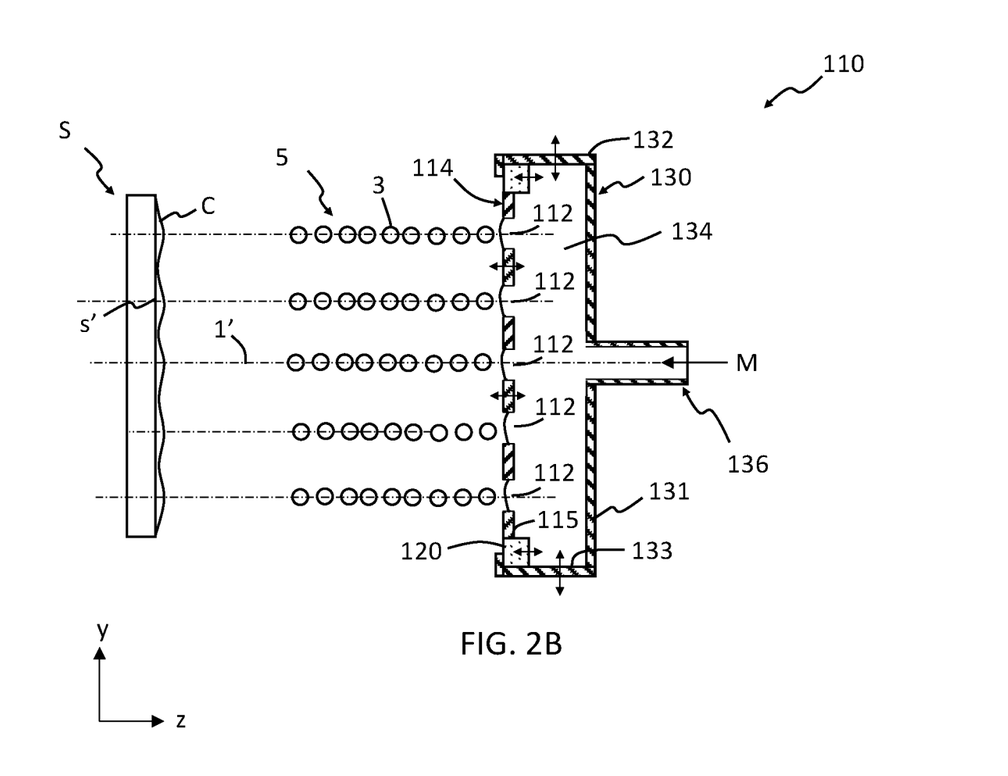
FIG. 2B schematically depicts a side cross-sectional view of section 2B-2B in FIG. 2A.

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of devices, methods, and systems for controlling the application of paint to automotive vehicles in a high production environment, which reduce overspray and increase transfer efficiency of the paint. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Referring now to FIG. 1, a paint spray system 2 for painting a part P using a robotic arm 4 is schematically depicted. The robotic arm 4 is coupled to at least one material applicator 10 and a rack 5. A material source 8 (e.g., a paint source) is included and includes at least one material M (materials $M_1$, $M_2$, $M_3$, . . . $M_n$ shown in FIG. 1; referred to herein simply as "material M" and "material(s)"). In some aspects of the present disclosure the material M includes paint materials, adhesive materials, sealant materials, and the like. The arm 4 moves according to xyz coordinates with respect to rack 5 such that the material applicator 10 moves across a surface (not labeled) of the part P. Also, a power source 6 is configured to supply power to arm 4 and rack 5. The arm 4, rack 5, and power source 6 are configured to supply material M from the material source 8 to the material applicator 10 such that a coating is produced on the surface of the part P. While FIG. 1 schematically depicts a paint system 2 with one robotic arm 4, it should be understood that paint spray systems 2 with more than one robotic arm 2 are included in the teachings of the present disclosure.

Referring now to FIGS. 2A and 2B, a material applicator 10 according to the teachings of the present disclosure is schematically shown. In one form of the present disclosure, the material applicator 10 includes an array plate 100 with an applicator axis 1 and an array of micro-applicators 102 comprising a plurality of micro-applicators 110. In some aspects of the present disclosure, the array plate 100 with the array of micro-applicators 102 is positioned within a housing 140. Each of the micro-applicators 110 comprises a plurality of apertures 112 through which a material M is ejected such that atomized droplets 3 of the material is provided (FIG. 2B). Particularly, each of the micro-applicators 110 includes a micro-applicator plate 114 with the plurality of apertures 112 extending through the micro-applicator plate 114. In one aspect of the present disclosure, each of the micro-applicators 110 includes a transducer 120. In another aspect of the present disclosure, only a subset of the micro-applicators 110 include a transducer. However, in both aspects of the present disclosure each of the micro-applicator plates 114 are in mechanical communication with a transducer 120 such that excitation (i.e., vibration) of at least one transducer 120 vibrates each of micro-applicator plates 114 as schematically depicted by the horizontal (z-direction) double-headed arrows in FIG. 2B.

The micro-applicator 110, i.e., each of the micro-applicators 110 includes a frame 130 and a material inlet 136. The frame 130 includes a back wall 131 and at least one sidewall 132 such that a reservoir 134 for containing the material M is provided between the back wall 131 and the micro-applicator plate 114. The inlet 136 is in fluid communication with the reservoir 134 such that the Material M flows through the inlet 136 and into the reservoir 134. In some aspects of the present disclosure, the transducer 120 is positioned between the micro-applicator plate 114 and the frame 130. For example, the transducer 120 may be positioned between an outer edge surface 115 of the micro-applicator plate 114 and an inner surface 133 of a sidewall 132.

Still referring to FIG. 2B, surface tension of the material M resists the material M from flowing through the apertures 112 of the micro-applicator plate 114 unless the transducer 120 is activated and vibrates. That is, when the transducer 120 is activated and vibrates, the material M is ejected through and/or from the plurality of apertures 112 to provide a stream 5 of atomized droplets 3. The stream 5 of atomized droplets 3 propagates generally line-of-sight from the apertures 112 (and the array of micro-applicator 110) to the substrate S and forms a coating C on a surface s' of a substrate S. That is, the stream 5 of atomized droplets 3 propagates generally parallel to a micro-applicator axis 1' and forms the coating C on a surface s' of a substrate S. As schematically depicted in FIG. 2B, the atomized droplets 3 have a narrow droplet size distribution (e.g., average droplet diameter) and may result in a thickness (z-direction) of the coating C not being uniform and having streaks. For example, if the material applicator 10 moves across the surface s' along the x-direction depicted in the figures, the alternating thin-thick thicknesses along the y-direction of the coating C will appear as streaks along the x-direction. As used herein, the term "streak" or "streaks" refers to coating with a non-uniform thickness such that the coating has a non-uniform appearance when viewed by an observer.

Referring now to FIGS. 3A and 3B, a material applicator 12 for providing a coating with a uniform thickness (i.e., without streaks) according to the teachings of the present disclosure is schematically shown. In one form of the present disclosure, the material applicator 12 includes the same array plate 100, applicator axis 1, transducers 120, frame 130, and housing 140 as the material applicator 10 (FIGS. 2A-2B). However, in some aspects of the present disclosure the array plate 100 rotates back and forth about the applicator axis 1. In such aspects, a movement device 150 (e.g. a motor), may be in mechanical and/or electrical communication with the array plate 100 and be configured to rotate the array plate 100 back and forth within the housing 140. For example, the movement device 150 in combination with bearings 160, a journal surface (not labeled), and the like, may provide rotation of the array plate 100 back and forth within the housing 140. In the alternative, or in addition to, the movement device 150 may provide rotation of the array plate 100 and the housing 140 back and forth around the applicator axis 1. As used herein, the phrase "back and forth" refers to rotating or moving in a first direction about an axis followed by rotating or moving in a second direction about the axis that is generally opposite to the first direction as schematically depicted by the double-headed arrows in FIG. 3A.

It should be understood that the array plate 100 may rotate a first angle around the applicator axis 1 in the first direction and rotate a second angle about the applicator axis 1 in the second direction. In some aspects of the present disclosure, the first angle is the same as the second angle. In other aspects of the present disclosure, the first angle is not the same as the second angle. In some aspects of the present disclosure, the first angle and the second angle may be between 1 and 45 degrees, for example between 5 and 30 degrees or between 10 and 20 degrees. Also, the applicator axis 1 may be positioned at the center of the array of micro-applicators 102 as schematically depicted in FIG. 3A, or in the alternative, the applicator axis may be positioned offset from the center of the array of micro-applicators 102 (not shown).

Referring particularly to FIG. 3B, rotation of the array plate 100 back and forth around the applicator axis 1 rotates each of the micro-apertures 110 around the applicator axis 1. Accordingly, and as the array plate 100 rotates around the applicator axis 1, diffuse streams 5' of atomized droplets 3 are ejected from the plurality of apertures 112. The diffuse streams 5' of atomized droplets 3 propagate generally line-of-sight from the apertures 112 to the substrate S. That is, the diffuse streams 5' of atomized droplets 3 propagate generally parallel to a micro-applicator axis 1'. Also, the atomized droplets 3 from each of the apertures 112 overlap with atomized droplets 3 from adjacent apertures 112 such that the coating C' has a uniform thickness (z-direction) and a uniform appearance (i.e., no streaks) across the surface s' (x- and y-directions) of the substrate S. It should be understood that in the alternative, or in addition to, atomized droplets 3 from each of the micro-applicators 110 may overlap with atomized droplets 3 from adjacent micro-applicators 110 such that the coating C' on the surface s' of the substrate S is provided without streaks. The material applicator 12, and other material applicators described herein, may be used to provide a coating on a surface such as a paint coating, an adhesive coating, a sealant coating, and the like.

While FIG. 3B schematically depicts material M entering the reservoir 134 through the inlet 136 and exiting the reservoir 134 through the apertures 112, it should be understood that other flow configurations of the material M are included in the teachings of the present disclosure. For example, FIG. 3C schematically depicts a micro-applicator 110 with the frame 132 comprising an inlet 138 and an outlet 139 such that material M enters the reservoir 134 through the inlet 138 and exits the reservoir 134 through the plurality of apertures 112 and the outlet 139. It should be understood that the outlet 139 provides additional flexibility in the use of the material applicator 12. For example, the rate of flow of the material M through the inlet 138 can be used to adjust the pressure of the material M in the reservoir 134 and thereby can be used to adjust a flow rate and/or atomized droplet size of the atomized droplets 3.

Referring now to FIGS. 4A and 4B, in another form of the present disclosure a material applicator 20 with a non-circular shape is provided. Particularly, the material applicator 20 has a rectangular shaped array plate 200 with an applicator array 202 comprising a plurality of the microapplicators 110. Each of the micro-applicators 110 includes the plurality of apertures 112 as discussed above with reference to FIGS. 3A-3B. The array plate 200 with the plurality of micro-applicators 100 moves along a length (x-direction) axis 201L and/or a width (y-direction) axis 201W of the material applicator 20. For example, one or more movement devices 260 (FIG. 4A); also referred to herein as "mechanical actuators 260") and/or one or more movement devices 270 (FIG. 4B; also referred to herein as "cams 270") may be positioned between the array plate 200 and a housing 240. The one or more mechanical actuators 260 are configured to expand and contract such that the array plate 200 moves back and forth generally parallel to the length axis 201L; back and forth generally parallel to the width axis 201W; back and forth generally at an angle not equal to zero along the length axis 201L and the width axis W; and back and forth generally translating in a curved motion between the length axis 201L and the width axis 201W. Also, the one or more cams 270, with an optional biasing member 274 (e.g., a spring), are configured to rotate about a cam axis 272 such that the array plate 200 moves back and forth generally parallel to the length axis 201L; back and forth generally parallel to the width axis 201W; back and forth generally at an angle not equal to zero along the length axis 201L and the width axis W; and back and forth generally translating in a curved motion between the length axis 201L and the width axis 201W. It should be understood that the one or more mechanical actuators 260 and/or one or more cams 270 may be configured to move array plate 200 back and forth at an angle not equal to zero along the length axis 201L and/or width axis 201W. Furthermore, the movements, rotationally or translationally, can be tuned to an algorithm, frequency, program, and/or waveform with a periodicity (e.g., frequency) ranging from the infrasonic range (i.e., less than 15 Hz) up to and including the ultrasonic range (i.e., 20,000-100,000 Hz).

Figure 3A:
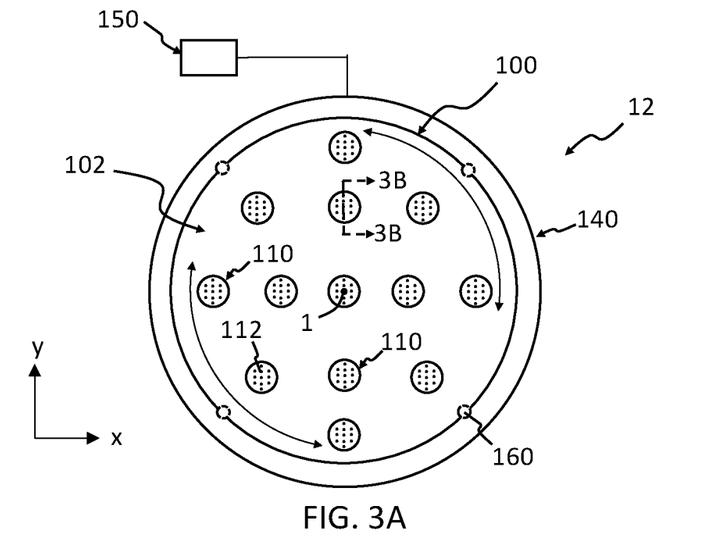
FIG. 3A schematically depicts a planar view of an array of micro-applicators that rotate back and forth about an applicator axis according to the teachings of the present disclosure.
Figure 3B:
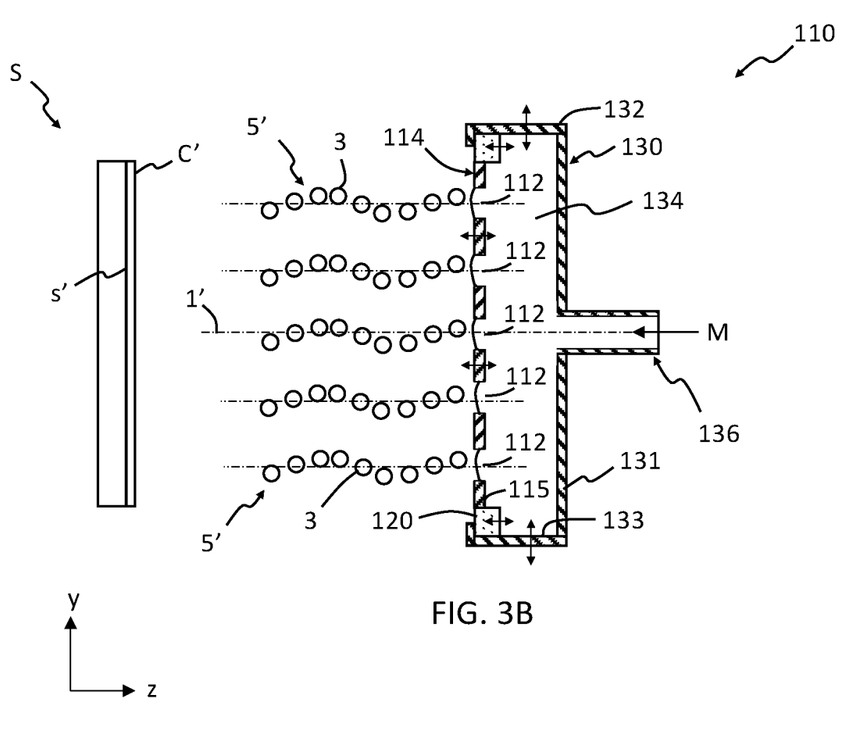
FIG. 3B schematically depicts a side cross-sectional view of section 3B-3B in FIG. 3A.
Figure 3C:
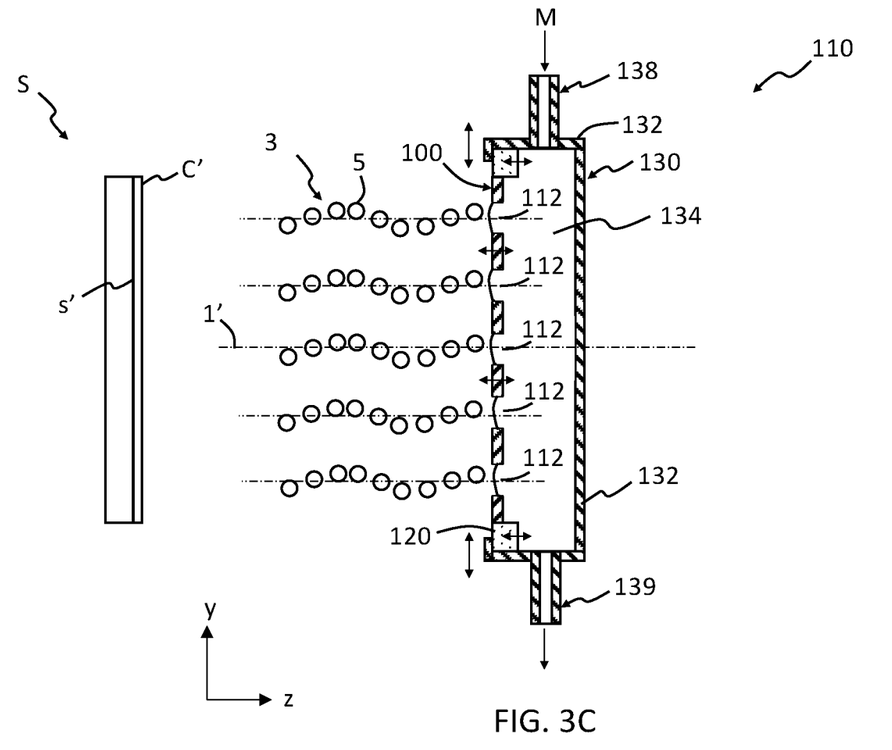
FIG. 3C schematically depicts another side cross-sectional view of section 3B-3B in FIG. 3A.
Figure 4A:
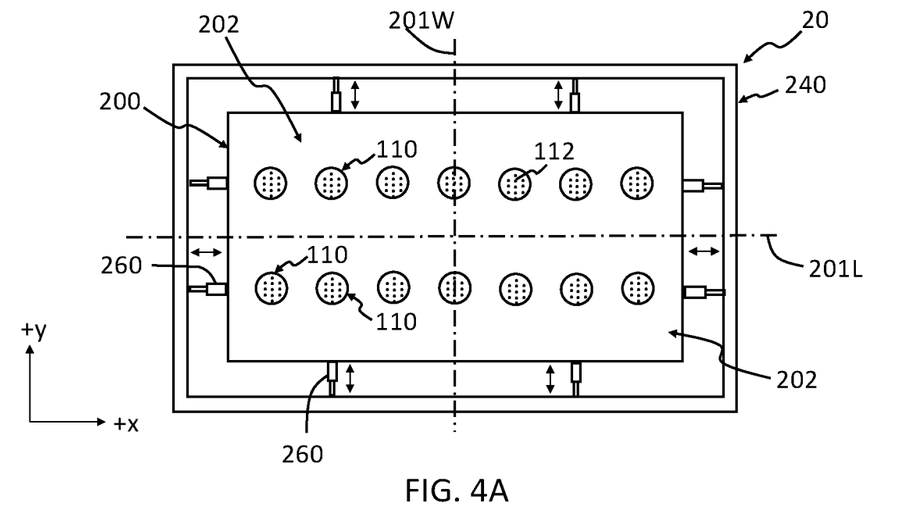
FIG. 4A schematically depicts a planar view of an array of micro-applicators that move back and forth along an axis according to the teachings of the present disclosure.
Figure 4B:
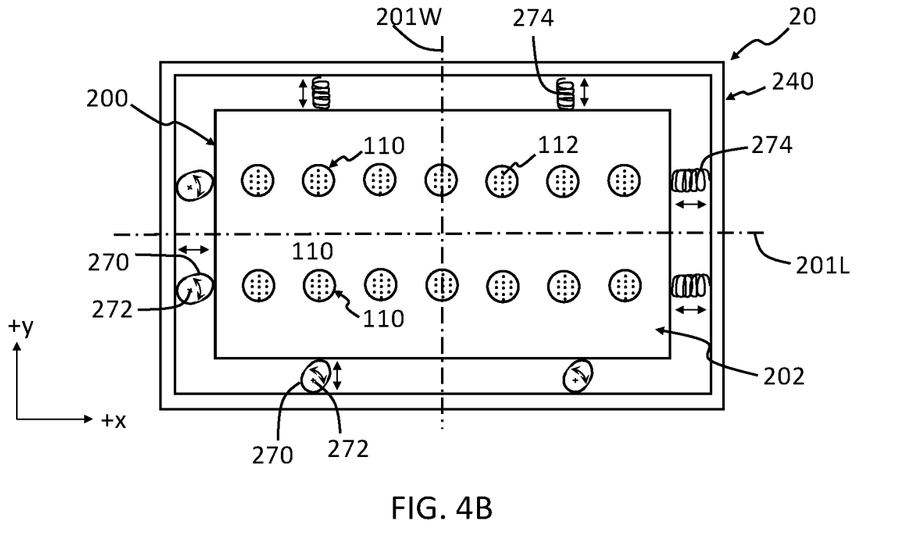
FIG. 4B schematically depicts a planar view of an array of micro-applicators that move back and forth along an axis according to the teachings of the present disclosure.
Figure 5:
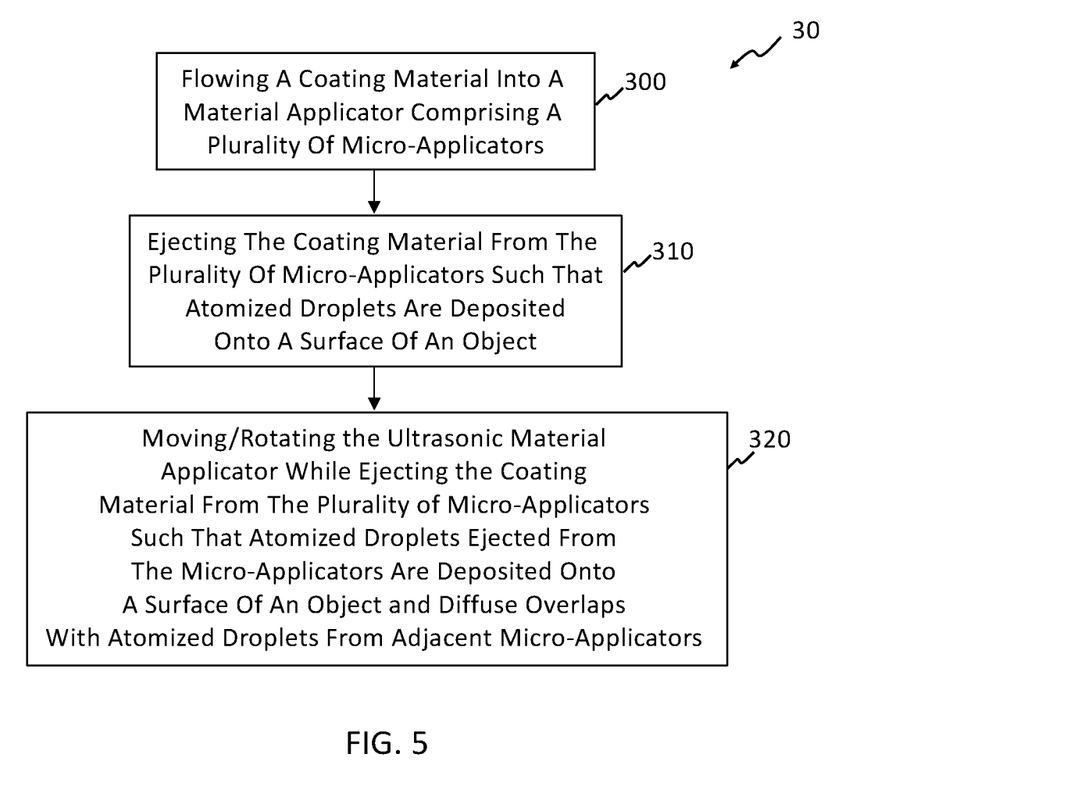
FIG. 5 schematically depicts a flow chart for a method according to the teachings of the present disclosure.

It should be understood that the array plate 200 may move a first distance along the length of the length axis 201L and/or width axis 201W in a first direction and move a second distance along the length of the length axis 201L and/or width axis 201W in a second direction that is generally opposite the first direction. In some aspects of the present disclosure, the first distance is the same as the second distance. In other aspects of the present disclosure, the first distance is not the same as the second distance. In some aspects of the present disclosure, the first distance and the second distance may be between 1 mm and 10 mm, for example between 1 mm and 5 mm or between 2 mm and 5 mm. Also, the applicator axis 1 may be positioned at the center of the array of micro-applicators 102 as schematically depicted in FIG. 3A, or in the alternative, the applicator axis may be positioned offset from the center of the array of micro-applicators 102 (not shown).

The plurality of micro-applicators 110 of the material applicator 20 eject atomized droplets 3 that propagate in a direction generally parallel to a micro-applicator axis 1' (FIG. 2B) as described above for the material applicator 10. Also, and in addition to the material being ejected through the plurality of apertures 112, movement of the array plate 200 back and forth along the length axis 201L and/or width axis 201W moves each of the micro-apertures 110 such that a diffuse stream 5' of atomized droplets 3 is provided by the plurality of apertures 112 and a coating C' on the surface s' of a substrate S without streaks is provided (FIG. 3B). In the alternative, or in addition to, atomized droplets 3 from each of the micro-applicators 110 in the material applicator 20 may overlap with atomized droplets 3 from adjacent micro-applicators 110 such that the coating C' on the surface s' of the substrate S is provided without streaks.

It should be understood that material applicators with a plurality of micro-applicators having different shapes than circular or rectangular (e.g., triangular, elliptical, etc.) as schematically depicted in FIGS. 2A-4B are included within the teachings of the present disclosure.

Referring now to FIGS. 3A-3B and 5, a flow chart for a method 30 of controlling application of material onto a substrate according to the teachings of the present disclosure is shown in FIG. 5. The method 30 includes flowing a material M into a material applicator 12 that comprises a plurality of micro-applicators 110 at step 300. Each of the plurality of micro-applicators 110 includes a plurality of apertures 112 and a reservoir 134 such that the material M flows into the reservoir 134. The material M is ejected through and/or from each of the plurality of apertures 112 in the form of atomized droplets 3, travel in a direction that is generally parallel to a micro-applicator axis 1' of the micro-applicator 110 and are deposited on a surface s' of a substrate S at step 310. During the ejection of the material M from the plurality of apertures 112, the material applicator 12 is rotated back and forth about the applicator axis 1 at step 320. Rotation of the material applicator 12 back and forth about the applicator axis 1 results in a diffuse stream 5' of atomized droplets 3 from each of the plurality of apertures 112. That is, atomized droplets 3 from each of the plurality of apertures 112 overlap with atomized droplets 3 from adjacent apertures 112 such that a coating C' with a generally uniform thickness (z-direction) and without streaks is formed on the surface s'.

While FIG. 5 schematically depicts a method 30 of controlling application of material onto a substrate with reference to FIGS. 3A-3B, it should be understood that the method 30 may include the material applicator 20 schematically depicted in FIGS. 4A-4B.

The material applicator 12, and other material applicators disclosed herein, may be formed from known materials used in the manufacture of material applicators. The array plate 100, the micro-applicator plate 114, the frame 130 and the housing 140 may be formed from metallic materials, polymer materials, ceramic materials, and/or composites materials. Non-limiting examples of metallic materials include steels, stainless steels, nickel-base alloys, cobalt-base alloys, and the like. Non-limiting examples of polymer materials include nylon, low-density polyethylene (LDPE), high-density polyethylene (HDPE), polypropylene (PP), polyvinyl chloride (PVC), and the like. Non-limiting examples of ceramic materials include alumina (Al2O3), silica (SiO2), mullite (e.g., $3Al_2O_3.2SiO_2$), titanium nitride (TiN), and the like. Non-limiting examples of composite materials include fiber reinforced polymers, ceramic matrix composites, metal matrix composites, and the like. The transducer 120 may be formed from piezoelectric materials such as barium titanate ($BaTiO_3$), lead zirconate titanate (PZT), potassium niobite ($KNbO_3$), sodium tungstate ($Na_2WO_4$) and the like. The material M may be at least one material used to form a coating or layer on a surface of a substrate.

It should be understood from the teachings of the present disclosure that a material applicator and a method of using a material applicator providing a coating with a uniform thickness are provided. The material applicator includes an array of micro-applicators and each micro-applicator has a plurality of apertures through which a material is ejected. At least one transducer is mechanically coupled to the array of micro-applicators such that a stream of atomized droplets propagates generally parallel to an array axis. Also, the array of micro-applicators rotate back and forth around the array axis and/or move back and forth along a length and/or width axis of the array of micro-applicators such that a diffuse stream of the atomized droplets is provided. Propagation of the diffuse stream of atomized droplets generally parallel to the array axis reduces overspray during the application of a paint, adhesive and/or sealant onto the surface of the substrate.

Unless otherwise expressly indicated herein, all numerical values and directional terms indicating dimensions and/or tolerances, or other characteristics are to be understood as modified by the word "about" or "generally" in describing the scope of the present disclosure. This modification is desired for various reasons including industrial practice, manufacturing technology, and testing capability.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of controlling application of material onto a substrate comprising:
    ejecting atomized droplets from a material applicator comprising at least one transducer and an array plate with an array of micro-applicators, wherein:
        each of the micro-applicators has a material inlet, a reservoir, and a micro-applicator plate in mechanical communication with the at least one transducer, and the micro-applicator plate has a plurality of apertures through which the at least one material is elected as atomized droplets when the transducer vibrates the micro-applicator plate; and
    the atomized droplets travel line-of-sight from the array of micro-applicators to a surface of the substrate; and
    moving the array of micro-applicators cyclically about at least one axis such that the atomized droplets from each of the plurality of micro-applicators overlap with atomized droplets from adjacent micro-applicators and diffuse overlap of deposited atomized droplets from adjacent micro-applicators is provided on the surface.

2. The method according to claim 1, wherein the array of micro-applicators cyclically rotates back and forth around the at least one axis of the array of micro-applicators.

3. The method according to claim 2, wherein the array of micro-applicators rotates back and forth around the at least one axis of the array of micro-applicators at a predetermined frequency.

4. The method according to claim 1, wherein the array of micro-applicators moves back and forth parallel to the at least one axis of the array of micro-applicators.

5. The method according to claim 4, wherein the array of micro-applicators moves back and forth parallel to the at least one axis of the array of micro-applicators at a predetermined frequency.

6. The method according to claim 1, wherein the at least one axis is a pair of orthogonal axes and the array of micro-applicators moves back and forth parallel to each of the pair of orthogonal axes.

7. The method according to claim 1, wherein the at least one axis of the array of micro-applicators is a central axis of the array of micro-applicators.

8. The method according to claim 1, wherein the array of micro-applicators is part of an ultrasonic material applicator.

9. The method according to claim 1, wherein the surface of the substrate is a surface of a vehicle.

10. The method of according to claim 1 further comprising painting a vehicle by ejecting the atomized droplets from the array of micro-applicators and moving the array of micro-applicators cyclically about the at least one axis.

11. A method for applying a coating to a vehicle comprising:
    ejecting atomized droplets of a coating material from a material applicator comprising at least one transducer and an array plate with an array of micro-applicators, wherein:
        each of the micro-applicators has a material inlet, a reservoir, and a micro-applicator plate in mechanical communication with the at least one transducer, and the micro-applicator plate has a plurality of apertures through which the at least one material is elected as atomized droplets when the transducer vibrates the micro-applicator plate; and
    the atomized droplets travel line-of-sight from the array of micro-applicators to a surface of the vehicle;
    moving the array of applicators along a pattern adjacent to the surface of the vehicle such that the surface is coating with the coating material; and
    moving the array of micro-applicators cyclically about an axis of the array of micro-applicators such that the atomized droplets from each of the plurality of micro-applicators overlap with atomized droplets from adjacent micro-applicators due to the moving of the array of micro-applicators about the axis and provide a diffuse overlap with each other to form the coating on the surface of the vehicle without streaks.

12. The method according to claim 11, wherein the array of micro-applicators rotates back and forth around the axis of the array of micro-applicators.

13. The method according to claim 12, wherein the array of micro-applicators rotates back and forth around the axis of the array of micro-applicators at a predetermined frequency.

14. The method according to claim 11, wherein the array of micro-applicators moves back and forth along the axis of the array of micro-applicators.

15. The method according to claim 14, wherein the array of micro-applicators moves back and forth along the axis of the array of micro-applicators at a predetermined frequency.

16. The method according to claim 11, wherein the axis of the array of micro-applicators is a central axis of the array of micro-applicators.

\* \* \* \* \*